March 16, 1943.   A. G. GURRIES   2,314,041
LIFT FOR IMPLEMENT FRAMES
Filed Feb. 28, 1941   2 Sheets-Sheet 1

INVENTOR.
A. G. Gurries
ATTORNEYS

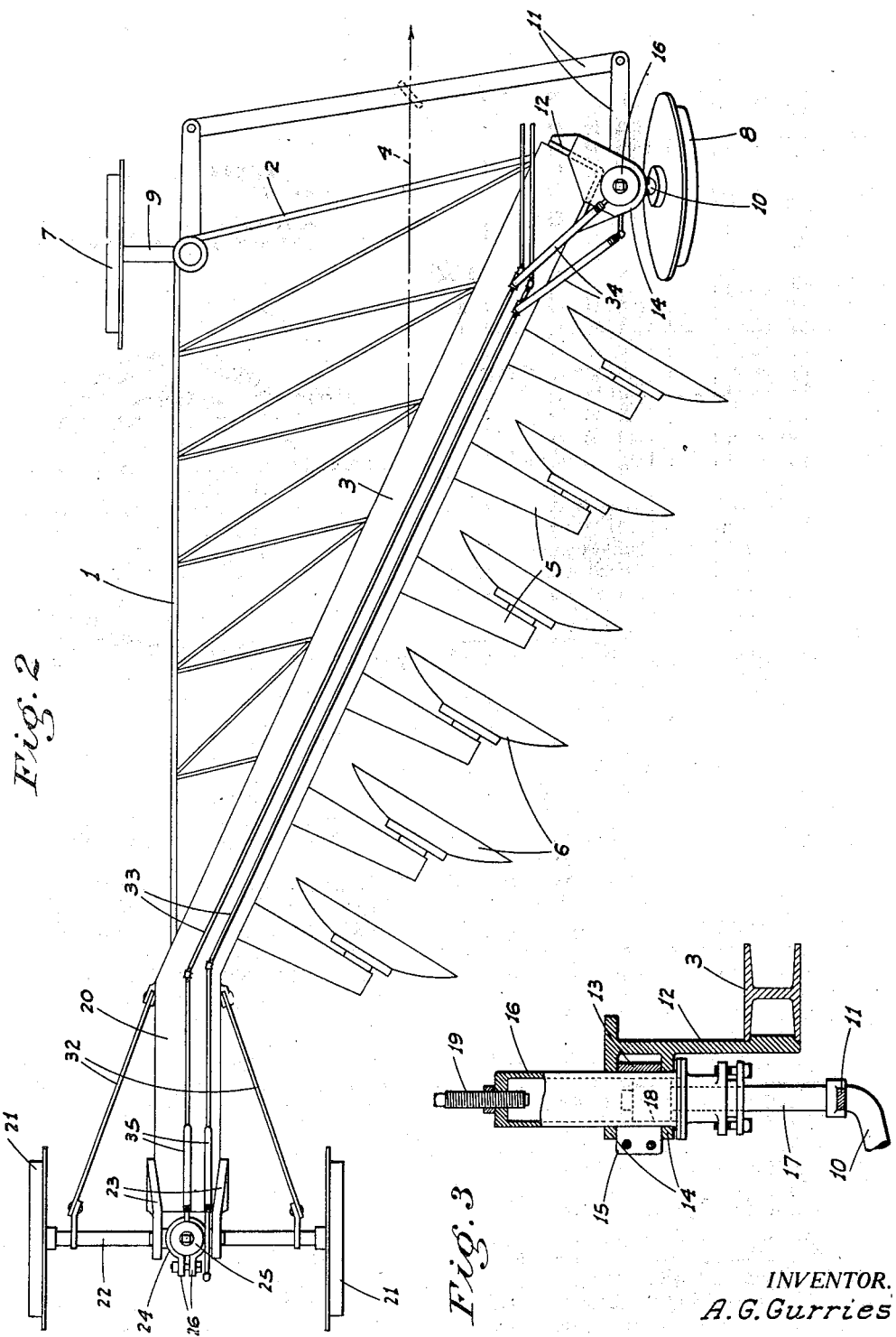

Patented Mar. 16, 1943

2,314,041

UNITED STATES PATENT OFFICE 2,314,041

LIFT FOR IMPLEMENT FRAMES

Albert G. Gurries, Gilroy, Calif.

Application February 28, 1941, Serial No. 381,084

3 Claims. (Cl. 97—50)

This invention is an improvement in lifts for implement frames of earth working implements, and in particular the invention is directed to, and it is my principal object to provide, a power lift for the frame of disc plows and the like.

It is also an object of the invention to embody a power actuated lift in an earth working implement of the type described, and to provide means whereby actuation of said lift is under the control of the operator of the draft vehicle.

A further object of the invention is to provide a unique hydraulic power lift for implement frames, and particularly implements such as disc gang plows wherein the frame is adjusted vertically relative to the supporting wheels to regulate the cutting depth.

Another object is to provide a lift arrangement, including a hydraulic cylinder, such that a lift greater than the length of the cylinder may be obtained.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a plan view of the plow and lift assembly.

Figure 3 is a fragmentary sectional view on line 3—3 of Fig. 1.

Figure 1:
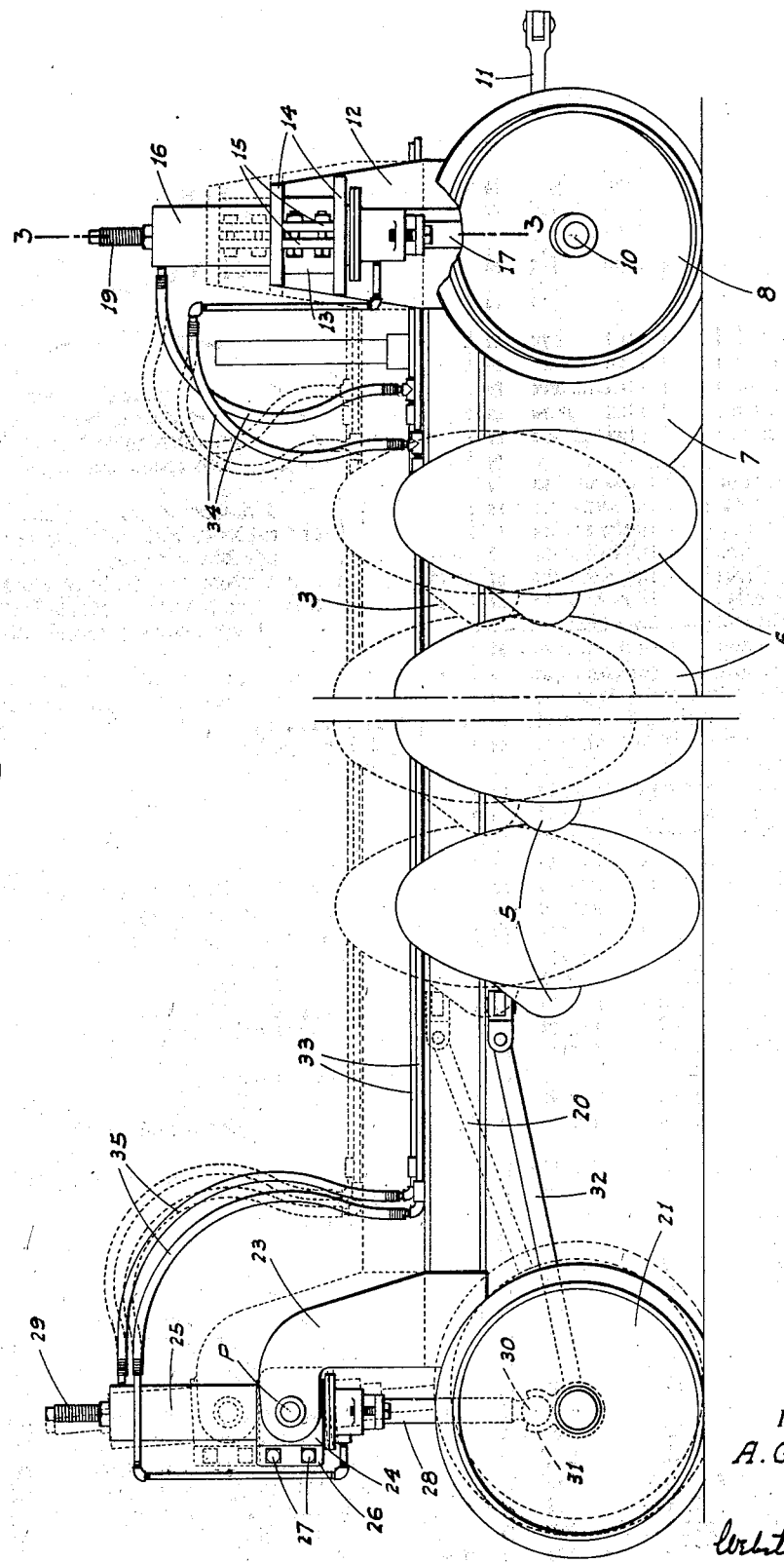
Figure 1 is a foreshortened side elevation of a disc plow embodying the invention, and taken from the disc side.

Referring now more particularly to the characters of reference on the drawings, the plow upon which the invention is here embodied, comprises an elongated and substantially triangular frame 1 disposed some distance above the ground for movement therealong; the wide end portion 2 of said frame being the leading end, and one rigid side beam 3 being of substantial strength and disposed at an acute angle to the direction of travel or draft as indicated by broken line 4. Suitable and conventional draft connections (not shown) are employed.

The beam 3 is fitted with longitudinally spaced brackets 5 which carry the discs 6 of the gang in customary relation to each other and to the frame 1.

At the forward end frame 1 is supported by transversely spaced wheels; the landside wheel being indicated at 7 and the furrow wheel at 8. The wheels 7 and 8 are mounted on horizontally swingable spindles 9 and 10 respectively; spindle 9 being mounted on the frame in the common manner and may be arranged for manual adjustment vertically, while spindle 10 is arranged with a hydraulic cylinder for power adjustment, as will hereinafter appear. A tie rod assembly indicated generally at 11 connects between spindles 9 and 10 and maintains wheels 7 and 8 in proper tracking relation to each other.

At its forward end and on the outside, beam 3 is fitted with an upstanding mounting plate or bracket 12 which is provided with a split sleeve 13 disposed with its axis vertical and on the outer side of said plate, and confined between flanges 14 on said bracket. The split sleeve includes bolt connected clamping flanges 15.

A vertical double-acting hydraulic cylinder 16 is slidably disposed in said sleeve and flanges 14 and is normally held or clamped in immovable relation thereto. A piston rod 17 projects from the lower end of cylinder 16 and is actuated by piston 18 in the cylinder; the lower end of the rod 17 extending laterally as spindle 10 and on which wheel 8 is mounted. The upper end of the cylinder is fitted with an axially adjustable stop screw 19 which limits upward movement of piston 18.

At the rear or trailing end, the frame 1 includes a longitudinal portion 20 and which is an integral part of beam 3; said end of the frame being supported by a truck including spaced wheels 21 on a transverse axle 22, the truck being connected with the frame portion 20 as follows:

An upstanding rearwardly facing gooseneck unit 23 is mounted on the rear end of frame portion 20 and includes a vertical split clamping sleeve 24 through which a hydraulic cylinder 25 extends. The split sleeve is pivoted on the gooseneck as at P for longitudinal swinging movement, and is formed with clamping flanges 26 connected by bolts 27, the sleeve normally being clamped about the cylinder. Cylinder 25 is the same as cylinder 16, except of smaller diameter; is double acting, and includes a piston rod 28 projecting from its lower end, and an adjustable piston stop screw 29 in its upper end.

The lower end of piston rod 28 is in the form of a ball 30 mounted in a socket 31 on axle 22 centrally of its ends. Radius rods 32 pivoted at both ends extend between axle 22 adjacent wheels 21 in converging relation to forward points on frame-portion 20. It will be apparent that the truck, including wheels 21 and axle 22, can swivel relative to frame 1 only in a transverse vertical plane.

A pair of pipes 33 extend along beam 3, the pipes adjacent their forward ends being connected with flexible hoses 34 leading to opposed parts of cylinder 16, while at their rear ends pipes 33 connect with flexible hoses 35 leading to corresponding parts of the rear cylinder 25.

The pipes 33 are connected by suitable conduits (not shown) with a hydraulic pump and valve assembly on the draft vehicle and which assembly is operative to feed fluid under pressure to either pipe 33.

Operation

In operation, the double acting hydraulic cylinders 16 and 25 are clamped by split sleeves 13 and 24 in such relative positons that the beam 3 is substantially horizontal and so that when the pistons are at their uppermost limit of travel and as regulated by stop screws 29, the discs 6 engage in the ground to the desired cutting depth.

When it is desired to raise the discs 6 from the ground, as when turning at the end of a furrow, the fluid under pressure is introduced into the top ports of cylinders 16 and 25, resulting in movement of the cylinders relative to their pistons in an upward direction, and effecting a raising action on the beam 3 of frame 1. It is to be noted that as the rearmost cylinder 25 is of lesser diameter than the front cylinder 16, the front cylinder will tend to effect its lifting action slightly ahead of the lifting action of the rear cylinder, as is desirable in plowing operations.

After the discs have been lifted from the ground, and a turn negotiated the operator reverses the pressure; that is, introduces a pressure into the bottom ports of cylinders 16 and 25, which effects a positive lowering movement of the cylinders relative to their pistons and a consequent lowering of beam 3 and the discs carried thereby.

By virtue of the structure described above the operator has a positive and nice control of the position of the discs relative to the ground and, without stopping the implement, can regulate the cutting depth as ground conditions may require.

When it is desired to transport the implement from place to place the discs 6 are first engaged on top the ground in resting position. Then the split sleeves 13 and 24 are released from cylinders 16 and 25 and such cylinders actuated to bring the split sleeves adjacent the top of said cylinders, as indicated in dotted lines in Fig. 1. Thereafter, the sleeves are again clamped on the cylinders and fluid introduced into the top of the latter, resulting in the cylinders and beam 3, together with the discs, raising upward a sufficient amount to cause discs 6 to be well clear of the ground so that the implement may be conveniently transported.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an earth working implement including a frame having a main beam, and spaced ground engaging supporting wheels for said frame; upstanding hydraulic cylinders disposed adjacent said main beam in spaced relation, said cylinders having downwardly projecting piston rods, means rotatably mounting said supporting wheels in connection with the lower ends of said rods, and means securing said main beam on the cylinders for raising and lowering movement with the latter; said wheel mounting means for one of said rods including a transverse axle, there being a wheel journaled on both ends of said axle, a ball on the lower end of said one rod, a socket on said axle in which the ball is non-removably seated, and pivoted tie rods extending lengthwise and upwardly from the axle on opposite sides of the socket to laterally spaced points on the frame, the corresponding cylinder being mounted for swinging movement in a vertical longitudinal plane.

2. In a disc plow including a frame of substantially triangular configuration, the frame being disposed for movement along the ground and with its apex at the rear end, a landside wheel supporting one forward corner of the frame, an upstanding hydraulic cylinder mounted on the other corner of the frame and including a downwardly projecting piston rod, a furrow wheel, means rotatably mounting the furrow wheel on the lower end of said piston rod, another upstanding hydraulic cylinder mounted on the rear end of the frame, said other cylinder including a downwardly projecting piston rod, a truck including spaced ground engaging wheels, and means mounting said truck on the lower end of said last named piston rod for swivel movement in a transverse vertical plane.

3. In an earth working implement which includes a frame disposed above and adapted for movement along the ground, an upstanding hydraulic cylinder having a downwardly projecting piston rod, means securing said cylinder on the frame for raising and lowering movement with the latter, a pair of supporting wheels, a transverse axle connecting said supporting wheels, a ball and socket unit connected between the lower end of said piston rod and said axle intermediate the ends of the latter, and pivoted tie rods extending lengthwise and upwardly from the axle on opposite sides of the ball and socket unit to connection with the frame, the cylinder being mounted on the frame for swinging movement lengthwise of the latter.

ALBERT G. GURRIES.